(12) United States Patent
Oosake

(10) Patent No.: US 8,805,107 B2
(45) Date of Patent: Aug. 12, 2014

(54) IMAGE DATA CODING APPARATUS, METHOD OF CONTROLLING OPERATION OF SAME, AND PROGRAM THEREFOR

(75) Inventor: Masaaki Oosake, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/471,368

(22) Filed: May 14, 2012

(65) Prior Publication Data
US 2012/0308128 A1 Dec. 6, 2012

(30) Foreign Application Priority Data

May 30, 2011 (JP) ................................. 2011-120618

(51) Int. Cl.
*G06K 9/36* (2006.01)
(52) U.S. Cl.
USPC ......................................................... 382/239
(58) Field of Classification Search
None
See application file for complete search history.

(56) References Cited

U.S. PATENT DOCUMENTS

| | | | | |
|---|---|---|---|---|
| 5,745,607 | A * | 4/1998 | Maeda .......................... | 382/240 |
| 6,785,423 | B1 * | 8/2004 | Joshi et al. ..................... | 382/235 |
| 6,885,395 | B1 * | 4/2005 | Rabbani et al. ............. | 348/231.1 |
| 2002/0191700 | A1 * | 12/2002 | Varshney et al. ........ | 375/240.19 |
| 2003/0142871 | A1 * | 7/2003 | Ishikawa ....................... | 382/233 |
| 2003/0185453 | A1 * | 10/2003 | Joshi et al. .................... | 382/239 |
| 2004/0136599 | A1 * | 7/2004 | Kadowaki ..................... | 382/232 |
| 2004/0252891 | A1 * | 12/2004 | Sasaki ........................... | 382/232 |
| 2005/0002575 | A1 * | 1/2005 | Joshi et al. .................... | 382/232 |
| 2005/0100226 | A1 * | 5/2005 | Kajiwara et al. .............. | 382/232 |
| 2005/0141773 | A1 | 6/2005 | Mizuno | |
| 2005/0196057 | A1 * | 9/2005 | Suh ................ | 382/239 |
| 2007/0223825 | A1 * | 9/2007 | Ye et al. ........................ | 382/240 |
| 2007/0242895 | A1 * | 10/2007 | Bandou et al. ................ | 382/251 |
| 2011/0176601 | A1 * | 7/2011 | Fukuhara ................. | 375/240.01 |
| 2012/0308128 | A1 * | 12/2012 | Oosake ......................... | 382/166 |

FOREIGN PATENT DOCUMENTS

| | | |
|---|---|---|
| JP | 2003-244443 A | 8/2003 |
| JP | 2004-064115 A | 2/2004 |
| JP | 2004-088164 A | 3/2004 |
| JP | 2005-192087 A | 7/2005 |

(Continued)

OTHER PUBLICATIONS

J. Li and S. Lei, "An embedded still image coder with rate-distortion optimization", SPIE: Visual Communication and Image Processing, vol. 3309, pp. 36-47, San Jose, CA, Jan. 1998.

(Continued)

*Primary Examiner* — Sean Motsinger
(74) *Attorney, Agent, or Firm* — McGinn IP Law Group, PLLC

(57) ABSTRACT

A wavelet transform, binary arithmetic coding and pass-by-pass partitioning of coded data streams according to JPEG 2000 are carried out and first and second layers for which the decoded image will have distortion ratios within a desired range are generated. If the total amount of code in the first layer is smaller than a target amount of code, then, from among coded data streams contained in the second layer, coded code up to a pass within a coded data stream having little influence upon image quality is added to the first layer. If the total amount of code in the first layer is greater than the target amount of code, then, from among coded data streams contained in the first layer, coded code within a coded data stream having little influence upon image quality is deleted from the first layer.

8 Claims, 7 Drawing Sheets

(56) References Cited

FOREIGN PATENT DOCUMENTS

| JP | 2004-064115 | | 10/2005 |
|---|---|---|---|
| JP | 2006-287487 | A | 10/2006 |
| JP | 2005-192087 | A5 | 3/2007 |
| JP | 2010-213059 | A | 9/2010 |

OTHER PUBLICATIONS

Notification of Reasons for Refusal (Japan) dated May 28, 2013 with English translation.

\* cited by examiner

*Fig. 9*
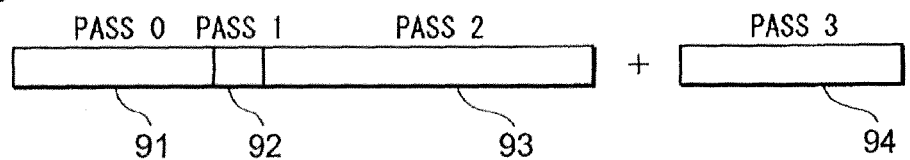
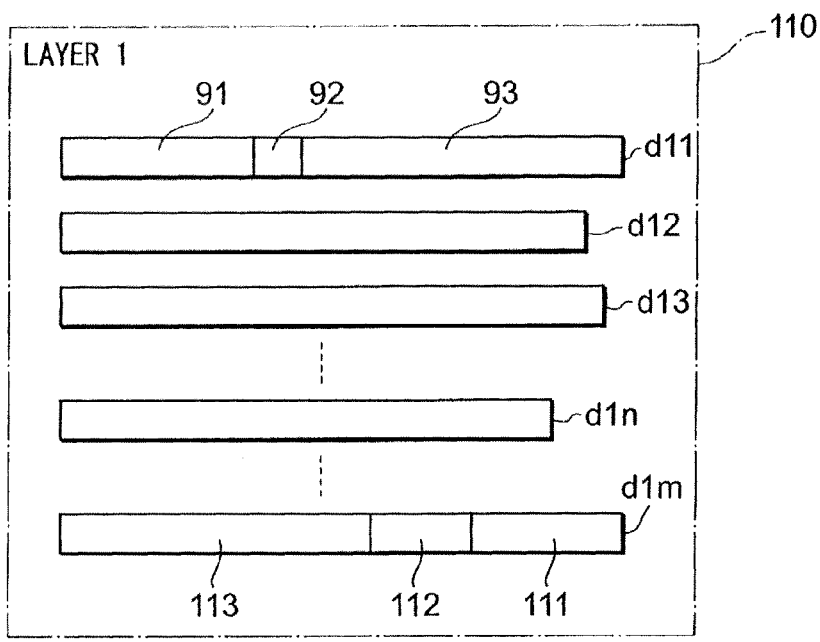
*Fig. 10A*
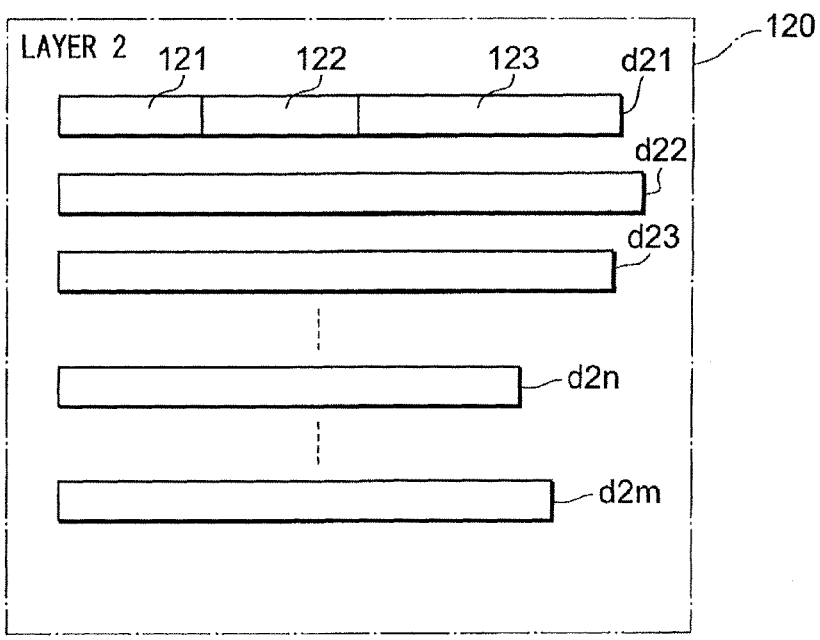
*Fig. 10B*

IMAGE DATA CODING APPARATUS, METHOD OF CONTROLLING OPERATION OF SAME, AND PROGRAM THEREFOR

BACKGROUND OF THE INVENTION

1. Field of the Invention

This invention relates to an image data coding apparatus and to a method and program for controlling the operation thereof.

2. Description of the Related Art

In comparison with the JPEG (Joint Photographic Experts Group) standard, the JPEG 2000 standard produces little noise even while raising the compression ratio. According to the JPEG 2000 standard, coding referred to as "EBCOT" (Embedded Block Coding with Optimized Truncation) is carried out after implementation of a wavelet transform (Non-Patent Document 1). Further, in coding such as provided by JPEG 2000, portions of code streams are discarded in such a manner that the overall amount of code will take on a target amount (Patent Document 1); computation such as a distortion slope for rate control is performed and rate control is carried out by discarding codes (Patent Document 2); the size of a code block, which is a unit of coding, is adjusted (Patent Document 3); compressed code data is re-compressed efficiently (Patent Document 4); and coding is performed at a high image quality (Patent Document 5).

[Patent Document 1]: Japanese Patent Application Laid-Open No. 2005-192087

[Patent Document 2]: Japanese Patent Application Laid-Open No. 2006-287487

[Patent Document 3]: Japanese Patent Application Laid-Open No. 2010-213059

[Patent Document 4]: Japanese Patent Application Laid-Open No. 2004-88164

[Patent Document 5]: Japanese Patent Application Laid-Open No. 2003-244443

[Non-Patent Document 1]: J. Li and S. Lei, "An embedded still image coder with rate-distortion optimization", SPIE: Visual Communication and Image Processing, volume 3309, pp. 36-47, San Jose, Calif., January 1998

However, the technique set forth in Non-Patent Document 1 cannot adjust the amount of code finely and often image quality varies greatly from image to image. Further, image quality cannot be adjusted finely using the techniques described in Patent Documents 1 to 5.

SUMMARY OF THE INVENTION

An object of the present invention is to arrange it so that image quality can be finely adjusted.

An image data coding apparatus according to the present invention comprises a subband partitioning device (subband partitioning means) for obtaining subband coefficients by partitioning image data into a plurality of subbands of different frequency components; a code block partitioning device (code block partitioning means) for partitioning the subband coefficients, which have been obtained by the subband partitioning device, into a plurality of code blocks; a coding device (coding means) for obtaining coded data by generating coding passes per bit plane with respect to subband coefficients included in the code blocks resulting from partitioning by the code block partitioning device, and binary coding the subband coefficients within the coding passes; a deciding device (deciding means) for deciding, in coding-pass units, coded data, from among the coded data obtained by the coding device, for which distortion ratio at the time of decoding into an image will fall within prescribed limits; a layer generating device (layer generating means) for repeating the coding by the coding device as well as the deciding of the coded data by the deciding device with regard to the plurality of code blocks resulting from partitioning by the code block partitioning device, thereby generating a layer that is to undergo adjustment of amount of coded data, the layer being a collection of coded data for which the distortion ratio at the time of decoding into an image will fall within prescribed limits; and a coded data amount adjusting device (coded data amount adjusting means) for adding, in coding-pass units, coded data having little influence upon image quality to a layer to undergo adjustment of amount of coded data, or deleting, in coding-pass units, coded data having little influence upon image quality from a layer to undergo adjustment of amount of coded data, in such a manner that the amount of coded data included in a layer generated by the layer generating device will take on a target amount of data, wherein the coded data added on or deleted is coded data, from among the coded data obtained by the coding device, which is included in a layer to undergo adjustment of amount of coded data.

The invention also provides an operation control method suited to the image data coding apparatus described above. Specifically, the invention provides a method of controlling an image data coding apparatus comprising the steps of: a subband partitioning device obtaining subband coefficients by partitioning image data into a plurality of subbands of different frequency components; a code block partitioning device partitioning the subband coefficients, which have been obtained by the subband partitioning device, into a plurality of code blocks; a coding device obtaining coded data by generating coding passes per bit plane with respect to subband coefficients included in the code blocks resulting from partitioning by the code block partitioning device, and binary coding the subband coefficients within the coding passes; a deciding device deciding, in coding-pass units, coded data, from among the coded data obtained by the coding device, for which distortion ratio at the time of decoding into an image will fall within prescribed limits; a layer generating device repeating the coding by the coding device as well as the deciding of the coded data by the deciding device with regard to the plurality of code blocks resulting from partitioning by the code block partitioning device, thereby generating a layer that is to undergo adjustment of amount of coded data, the layer being a collection of coded data for which the distortion ratio at the time of decoding into an image will fall within prescribed limits; and a coded data amount adjusting device adding, in coding-pass units, coded data, which has little influence upon image quality, to a layer to undergo adjustment of amount of coded data, or deleting, in coding-pass units, coded data, which has little influence upon image quality, from a layer to undergo adjustment of amount of coded data, in such a manner that the amount of coded data included in a layer generated by the layer generating device will take on a target amount of data, wherein the coded data added on or deleted is coded data, from among the coded data obtained by the coding device, which is included in a layer to undergo adjustment of amount of coded data.

The invention further provides a recording medium storing a computer-readable program for implementing the above-described method of controlling operation of an image data coding apparatus. The invention may provide the program.

In accordance with the present invention, image data is partitioned into subbands to thereby obtain subband coefficients. The subband coefficients obtained are partitioned into a plurality code blocks. With respect to the subband coefficients included in the code blocks resulting from partitioning, coding passes are generated per bit plane and binary coding is performed in the coding passes to thereby obtain coded data. From among the coded data obtained, coded data for which the distortion ratio at the time of decoding into an image will fall within prescribed limits is decided upon in coding-pass units. Such coding and deciding of coded data are repeated with regard to the plurality of code blocks, and a layer that is to undergo adjustment of amount of coded data is generated, with the layer being a collection of coded data for which the distortion ratio at the time of decoding into an image will fall within prescribed limits. Coded data having little influence upon image quality is added in coding-pass units to a layer to undergo adjustment of amount of coded data, or coded data having little influence upon image quality is deleted in coding-pass units from a layer to undergo adjustment of amount of coded data, in such a manner that the amount of coded data included in a generated layer will take on a target amount of data. The coded data added on or deleted is coded data included in a layer to undergo adjustment of amount of coded data. Since the amount of coded data contained in a layer to undergo adjustment of amount of coded data can be changed finely in coding-pass units, the image quality of the image represented by the layer can be changed finely. This makes fine adjustment of image quality possible.

For example, coded data obtained by coding subband coefficients of high-frequency components has less influence upon image quality in comparison with subband coefficients of low-frequency components.

Image data is color image data representing a color image, by way of example. In such case, a data partitioning device in which color image data is partitioned into luminance data and color data is provided. The processing by the subband partitioning device, the processing by the coding device and the processing by the deciding device is executed for every item of data of the luminance data and color data resulting from partitioning by the data partitioning device. For example, the layer generating device generates a layer that is to undergo adjustment of amount of coded data, the layer being a collection of coded data regarding luminance data and color data for which the distortion ratios at the time of decoding into an image will fall within prescribed limits. Coded data obtained by coding subband coefficients regarding the color data has less influence upon image quality in comparison with the luminance data.

By way of example, the subband partitioning device subjects image data to a wavelet transform, thereby partitioning the image data into subbands having different frequency components to thereby obtain wavelet transform coefficients.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 illustrates the manner in which coded data is added on; and

FIGS. 10A and 10B illustrates respective layers.

DESCRIPTION OF THE PREFERRED EMBODIMENT

A preferred embodiment of the present invention will now be described with reference to the drawings.

Figure 1:
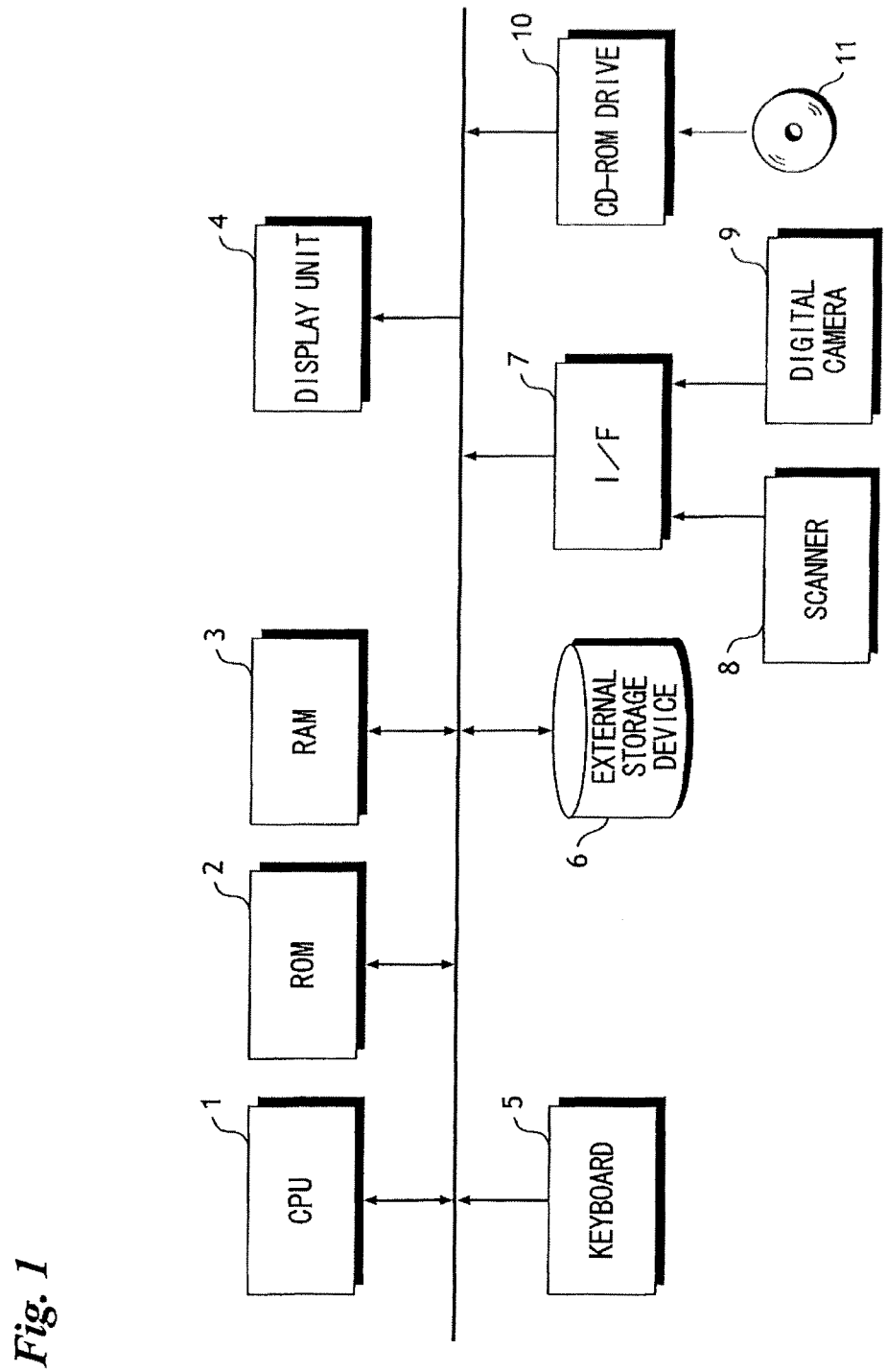
FIG. 1 is a block diagram illustrating the electrical configuration of an image data coding apparatus.

FIG. 1 is a block diagram illustrating the electrical configuration of an image data coding apparatus according to an embodiment of the present invention.

The overall operation of the image data coding apparatus is controlled by a CPU 1.

The image data coding apparatus includes a CD-ROM (Compact Disc-Read-Only Memory) drive 10. A CD-ROM 11 containing an operation program (described later) is loaded in the CD-ROM drive 10. When this is done, the operation program stored on the CD-ROM 11 is read and the operation program thus read is installed in the image data coding apparatus. The operation program is stored in a ROM 2. The operation program is not limited to storage on the CD-ROM 11 and may of course be stored on a memory card or other recording medium. Further, it may be arranged so that an operation program, which is transmitted over a network, is received by the image data coding apparatus and the received operation program is installed in the image data coding apparatus.

The image data coding apparatus according to this embodiment subjects color image data (although the image need not necessarily be a color image) to compression that is based upon the JPEG (Joint Photographic Experts Group) 2000 standard. The image data coding apparatus includes an external storage device 6 such as an external hard-disk drive. A multiplicity of items of color image data have been stored in the external storage device 6. A scanner 8 and a digital camera 9 are connected to the external storage device 6 via an interface 7.

Also connected to the image data coding apparatus are a RAM 3 for storing prescribed data and the like temporarily, a display unit 4 and a keyboard 5 for applying commands and the like to the image data coding apparatus.

Figure 2:
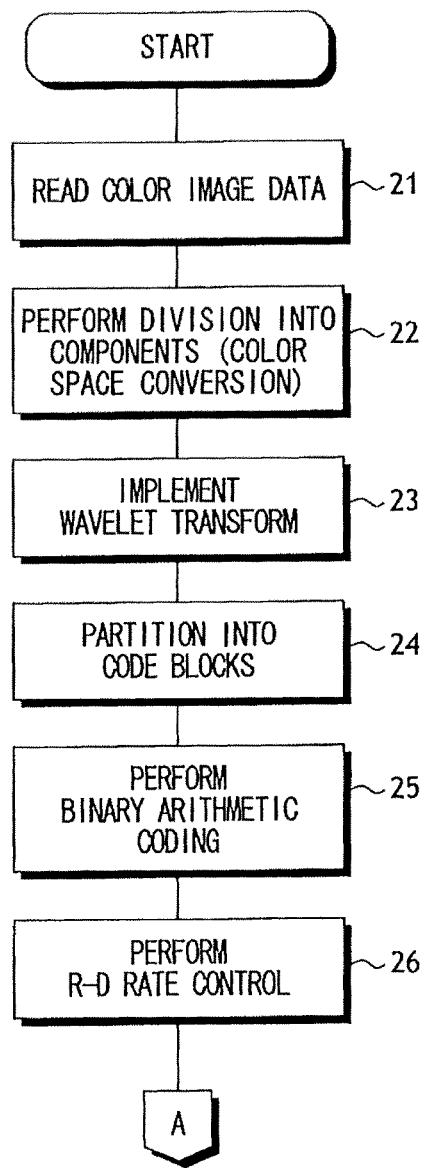
FIGS. 2 and 3 are portions of a flowchart illustrating processing executed by the image data coding apparatus.
Figure 3:
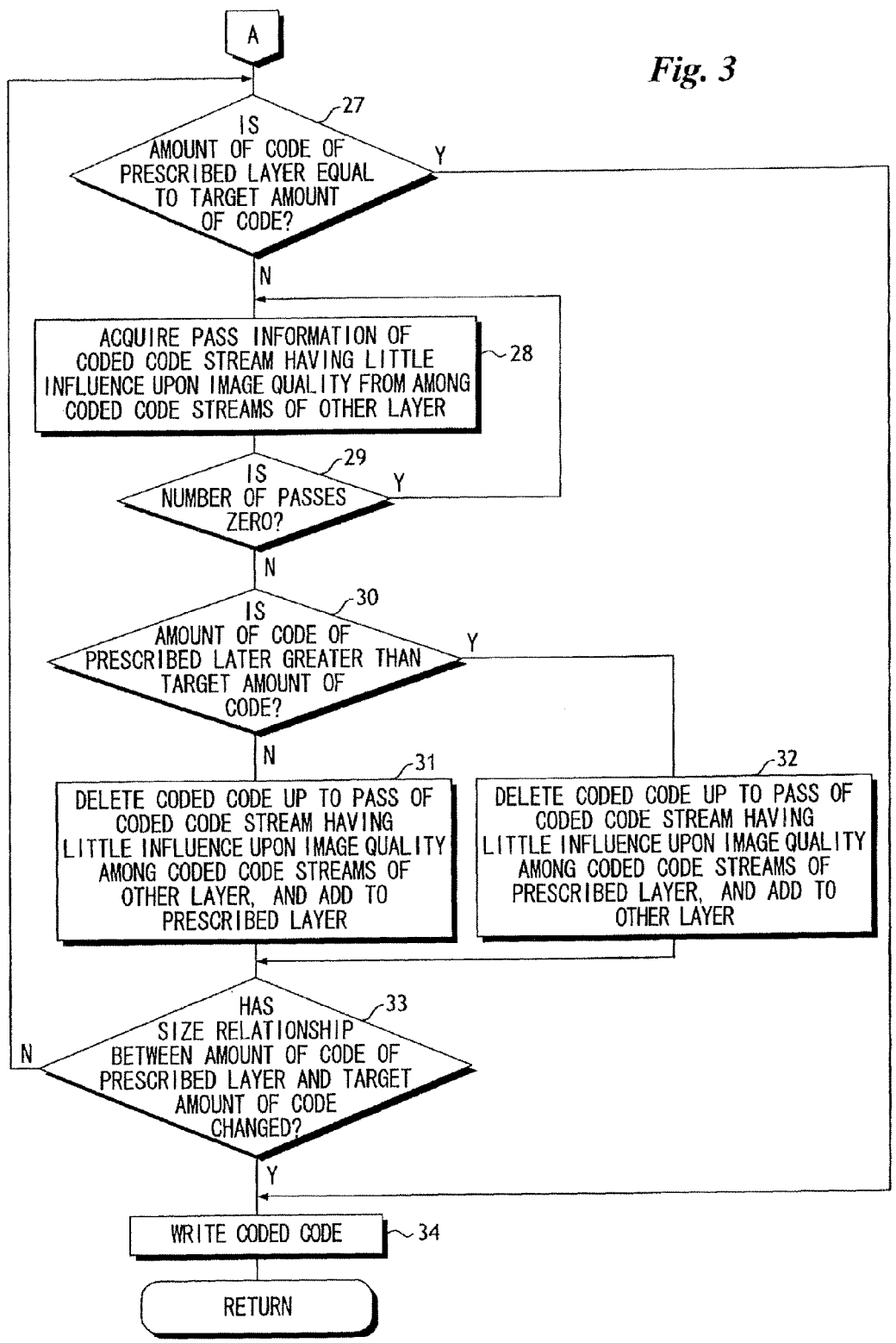

FIGS. 2 and 3 are portions of a flowchart illustrating processing executed by the image data coding apparatus.

Color image data to be coded is read from the external storage device 6 (step 21). The color image data may just as well be data that has been read by the scanner 8, data than has been stored in the digital camera 9 or data provided from some other device or the like and need not necessarily be data that has been stored in the external storage device 6. The color image data that has been read undergoes division into components (a color space conversion) to Y data, U data and V data (step 22). Although the color image data is divided by component division into Y data representing a luminance component as well as U data and V data representing color components, the color image data may just as well be divided into luminance data Y and color difference data Cr and Cb, or into RGB data of red, green and blue color components.

Figure 4:
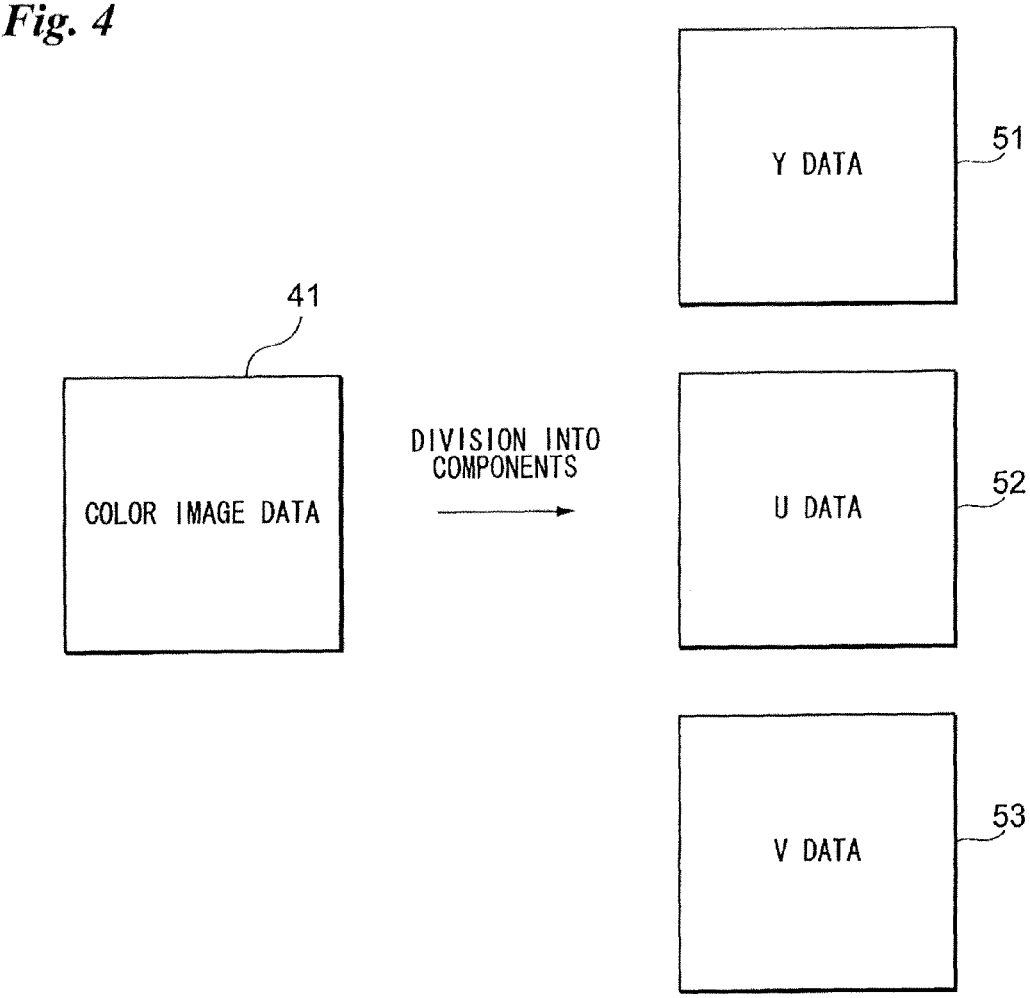
FIG. 4 illustrates the manner in which division into components is performed.

FIG. 4 illustrates how division into components is performed. As mentioned above, Y data 51, U data 52 and V data 53 is obtained by dividing color image data 41 into components.

With reference again to FIG. 2, the Y data 51, U data 52 and V data 53 obtained by division into components is subjected to a wavelet transform (step 23). As a result of the wavelet transform, the Y data 51, U data 52 and V data 53 is partitioned into subbands and wavelet transform coefficients (subband coefficients) are obtained (step 24).

Figure 5:
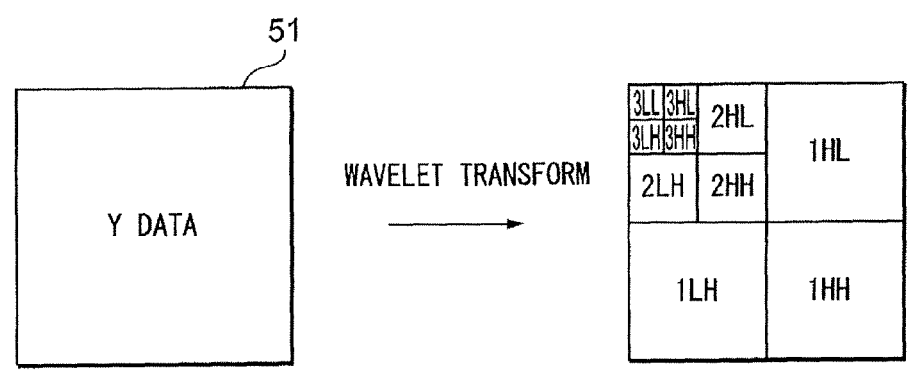
FIG. 5 illustrates the manner in which a wavelet transform is performed.

FIG. 5 illustrates how the Y data 51 undergoes the wavelet transform. The wavelet transform is applied not only to the Y data 51 but also to the U data 52 and V data 53. In this embodiment, the wavelet transform is implemented three times and the data is partitioned into nine subbands, namely 1HH, 1LH, 1HL, 2HH, 2LH, 2HL, 3HH, 3LH, 3HL and 3LL. Data need not necessarily be partitioned into nine subbands, and partitioning into less than or more than nine subbands is permissible.

Figure 6:
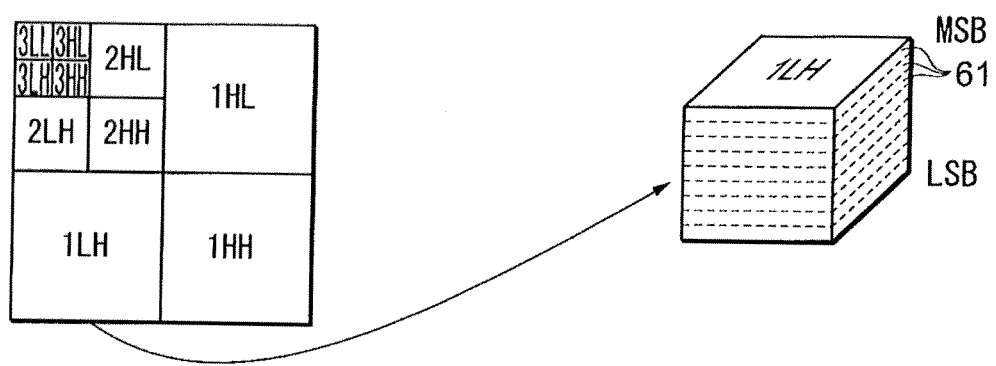
FIG. 6 illustrates bit planes.

FIG. 6 illustrates the details of the 1LH subband obtained by the wavelet transform.

The 1LH subband is composed of, for example, nine bit planes 61. In FIG. 6, the highest-order bit plane 61 corresponds to the MSB (Most Significant Bit) of wavelet transform coefficients, and the lowest-order bit plane 61 corresponds to the LSB (Least Significant Bit) of wavelet transform coefficients. Although only the single 1LH subband is shown in FIG. 6, this description of the bit planes holds for the other subbands as well.

With reference again to FIG. 2, the wavelet transform coefficients are partitioned into a plurality of code blocks when the wavelet transform is applied (step 24).

Figure 7:
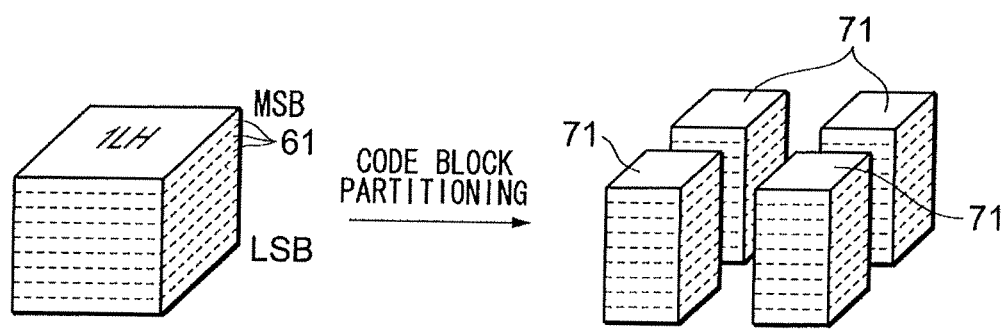
FIG. 7 illustrates the manner in which code block partitioning is performed.

FIG. 7 illustrates the manner in which wavelet transform coefficients are partitioned into a plurality of code blocks 71. A plurality of the code blocks 71 are obtained by such code block partitioning. Although only the one LH subband has been partitioned into the plurality of code blocks 71 in FIG. 7, subbands in addition to the 1LH subband are also partitioned into the plurality of code blocks 71. Further, although the 1LH subband has been partitioned into four code blocks 71 in FIG. 7, partitioning into a number of code blocks other than four is permissible.

With reference again to FIG. 2, all of the code blocks 71 are subjected to binary arithmetic coding for every code block 71 (step 25). When the binary arithmetic coding is performed, R-D (Rate-Distortion) control is carried out (step 26).

Figure 8:
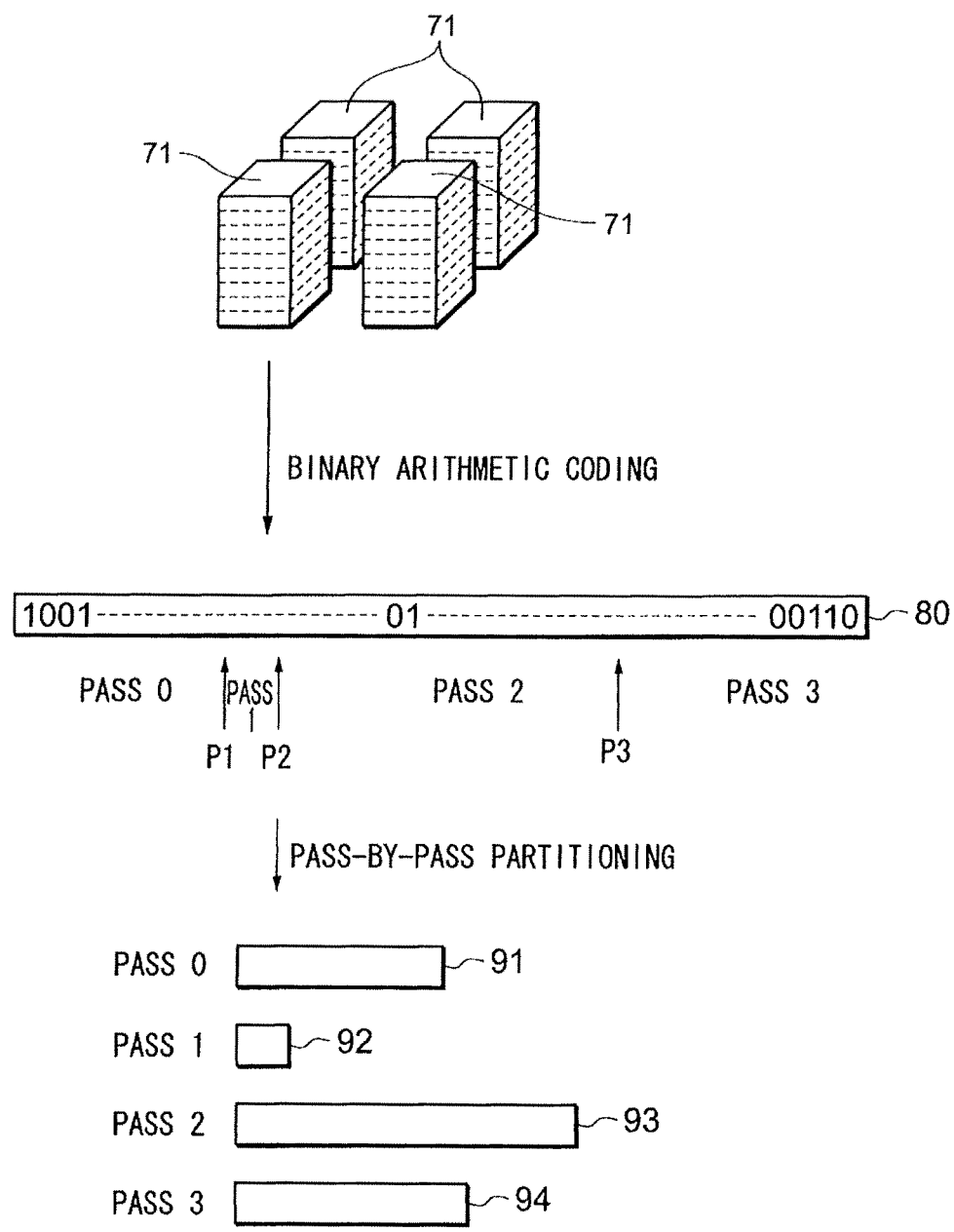
FIG. 8 illustrates binary arithmetic coding and the manner in which processing is performed for partitioning a code stream pass by pass.

FIG. 8 illustrates processing for binary arithmetic coding, etc.

By subjecting a desired code block 71 to binary arithmetic coding, a coded code stream 80 represented by "1"s and "0"s is obtained. This binary arithmetic coding is executed based upon pass information. A coding pass represents the state of the wavelet transform coefficients. Partitioning can be performed every coding pass. The positions at which the code stream has been partitioned are stored. For example, assume that coded codes at positions indicated by P1, P2 and P3 indicate the final positions of coded codes that have undergone a pass. Let the coded code streams up to P1, between P1 and P2, between P2 and P3 and from P3 onward be referred to as passes 0, 1, 2 and 3, respectively. When a coded code stream 80 corresponding to one code block 71 is partitioned pass by pass, a coded code stream 91 of pass 0, a coded code stream 92 of pass 1, a coded code stream 93 of pass 2 and a coded code stream 94 of pass 3 are obtained.

FIG. 9 illustrates the manner in which the coded code streams 91 to 94 of the partitioned passes 0 to 3 are applied.

An image is decoded by combining the coded code streams obtained by partitioning pass by pass. With R-D control, a prescribed distortion ratio is given and the coded code streams are combined so as to arrive at a distortion ratio that falls within the limits of the prescribed distortion ratio. For example, in a case where an image is to be decoded in such a manner that the distortion ratio will fall below 0.5, the distortion ratio will fall below 0.5 when the coded code stream 91 of pass 0, the coded code stream 92 of pass 1 and the coded code stream 93 of pass 2 are combined. However, when the distortion ratio will not fall below 0.5 if the coded code stream 94 of pass 3 is further included in the combination, the coded code stream 91 of pass 0, the coded code stream 92 of pass 1 and the coded code stream 93 of pass 2 are combined but the coded code stream 94 of pass 3 is not combined with these others. Combinations of coded code streams for which the distortion ratio of the decoded image will be less than 0.5 (the combinations are obtained by deciding the coded data) are collected for all code blocks to thereby form a first layer. Collected together in a second layer are coded code streams for which a prescribed distortion ratio (e.g., a distortion ratio of 0.5 to 0.8) will be obtained by combining code streams from among coded code streams that are not contained in the first layer. The above-described processing (R-D control) is executed while the distortion ratio is changed in such a manner that the total amount of code of the coded data contained in the first layer will take on a target amount of code.

FIGS. 10A and 10B illustrate examples of layers.

FIG. 10A illustrates a first layer 110. The first layer 110 is a collection of coded code streams d11, d12, d13, d1$n$, d1$m$ and so forth for which the distortion ratio of the decoded image will fall below 0.5.

FIG. 10B illustrates a second layer 120. The second layer 120 is a collection of coded code streams d21, d22, d23, d2$n$, d2$m$ and so forth for which the distortion ratio of the decoded image will be 0.5 to 0.8.

R-D control is carried out in such a manner that the total amount of code of the coded data within a layer will take on a target amount of code, as described above. With R-D control, however, the coded data contained in a layer fluctuates to the extreme when the distortion ratio is changed. This makes it difficult to perform a fine adjustment in such fashion that the total amount of code of the coded data within a layer will take on a target amount of code. In this embodiment, it is arranged so that the total amount of code of coded data within a layer is adjusted to take on a target amount of code and, moreover, so that image quality can be finely adjusted. It will be assumed that the total amount of code of coded data within the first layer 110 is adjusted to take on a target amount of code.

With reference to FIG. 3, whether the amount of code in the prescribed first layer (the layer in which image quality is finely adjusted; the layer in which the amount of coded data is to be adjusted) 110 is equal to a target amount of code is checked (step 27). If the amount of code in the prescribed first layer 110 obtained by the above-described R-D control is equal to the target amount of code ("YES" at step 27), then the coded data in the first layer 110 is written (step 34).

If the amount of code in the prescribed first layer 110 obtained by the above-described R-D control is not equal to the target amount of code ("NO" at step 27), then pass information of a coded code stream having little influence upon image quality is acquired from among coded code streams contained in the second layer 120, which is another layer (step 28). If the number of passes (obtained from the acquired pass information) of a coded code stream having little influence upon image quality is zero, this means that there is no code; therefore, pass information of a coded code stream having the next smallest amount of influence upon image quality is acquired (step 28). Thus is acquired pass information regarding coded code streams which have little influence upon image quality and, moreover, which have undergone a coding pass.

A coded code stream regarding color has less influence upon image quality than a coded code stream regarding luminance data. Further, a coded code stream representing high-frequency components of an image has less influence upon image quality than a coded code stream representing low-frequency components of an image. For example, the coded code stream obtained from the 1HH subband shown in FIG. 5 has the least influence upon image quality. Thus, which coded code streams will have little influence upon image quality is predetermined.

If the amount of code of the prescribed first layer 110 is less than the target amount of code ("NO" at step 30), then, from among the coded code streams d21, d22, d23, d2n, d2m and so on contained in the second layer 120, which is another layer, coded code up to the pass of a coded code stream having little influence upon image quality is deleted from the second layer 120 and the deleted coded code is added to the prescribed first layer 110 (step 31).

Which coded code stream will have little influence upon image quality has already been determined in the manner set forth above. For example, a code stream of U or V (color) data has less influence upon image quality than a coded code stream of Y (luminance) data, and a coded code stream representing wavelet transform coefficients of high-frequency components has less influence upon image quality than a coded code stream representing wavelet transform coefficients of low-frequency components. This means that a coded code stream which is U or V (color) data and, moreover, represents wavelet transform coefficients of the 1HH subband of high-frequency components has the smallest influence upon image quality. If pass processing has been executed with regard to such a coded code stream, then the coded code up to the position where the pass processing of this coded code stream was executed is added to the first layer 110. For example, assume that, from among the coded code streams d21, d22, d23, d2n, d2m and so on contained in the second layer 120, the coded code stream d21 is a coded code stream which is U or V (color) data and represents a code block representing wavelet transform coefficients of the 1HH subband of high-frequency components. Moreover, assume that this coded code stream d21 has undergone pass processing and has been divided into coded codes 121, 122 and 123 pass by pass. Under these assumptions, the coded code 121 constituting the coded code stream d21 is deleted from the second layer 120 and the deleted coded code 121 is added to the first layer 110.

Since the coded code 121 is added to the first layer 110, the image quality of the image, which is decoded from the all coded code stream contained in the first layer 110, is slightly improved. The image quality can be finely adjusted.

With reference to FIG. 3, if the size relationship between the amount of code in the prescribed first layer 110 and the amount of code in the second layer 120, which is the other layer, indicates no change from the result of the decision rendered at step 30 ("NO" at step 33), then the amount of code in the first layer 110 is considered not to be near the target amount of code. Processing from step 27 to step 32 is then repeated. For example, in the manner described above, the coded code 122 of the coded code stream d21 in the second layer 120 is deleted from the second layer 120 and the deleted coded code 122 is added to the first layer 110.

If the amount of code in the first layer 110 does not approach the target amount of code even though the coded code 122 has been added to the first layer 110, the processing from step 27 onward is repeated. If the number of passes is zero ("YES" at step 29) in the remaining coded code 123 of the coded code stream d21 among the coded code streams contained in the second layer 120 and pass processing has not been executed, then coded code that has undergone pass processing in a coded code stream which is other than the coded code stream d21 and, moreover, which is a coded code stream having the next smallest (or the same) influence upon image quality, is deleted from the second layer 120 and the deleted coded code is added to the first layer 110.

If the size relationship between the amount of code in the prescribed first layer 110 and the amount of code in the second layer 120, which is the other layer, indicates a change from the result of the decision rendered at step 30 ("YES" at step 33), then the amount of code in the first layer 110 is considered to be near the target amount of code. In this case, the coded code streams contained in the first layer 110 are written as codes representing the coded image (step 34). By decoding the codes thus written, an image of finely adjusted image quality is obtained.

If the amount of code in the prescribed first layer 110 is greater than the target amount of code ("YES" at step 30), then, from among the coded code streams contained in the first layer 110, coded code up to the pass of a coded code stream having little influence upon image quality is deleted in order to reduce the amount of code in the first layer 110. The deleted coded code is added to the second layer 120 (step 32).

For example, assume that, from among the coded code streams d11, d12, d13, d1n, d1m and so on contained in the first layer 110, the coded code stream d1m is a coded code stream having little influence upon image quality. The coded code 111 delimited by pass processing in the coded code stream d1m is deleted from the first layer 110. The deleted coded code 111 is added to the second layer 120.

If the size relationship between the amount of code in the first layer 110 and the target amount of code as judged at step 30 is unchanged ("NO" at step 33), processing from step 27 onward is repeated, as described above. For example, the coded code 112 is deleted from the coded data stream d1m, which has little influence upon image quality, and the deleted coded code 112 is added to the second layer 120. If the size relationship between the amount of code in the first layer 110 and the target amount of code as judged at step 30 remains unchanged ("NO" at step 33), deletion of coded data from the first layer 110 is carried out. However, if a pass does not exist in, for example, the coded data 113 of the coded data stream d1m, then coded data in which a pass exists and which is in a coded data stream, other than the coded data stream d1m, that has little influence upon image quality, is deleted from the first layer 110.

If the amount of code in the first layer 110 is less than the target amount of code and the size relationship between the amount of code in the first layer 110 and the target amount of code as judged at step 30 changes ("YES" at step 33), then the coded data streams contained in the first layer 110 are written (step 34).

Thus, the image quality of the image decoded from the coded code streams contained in the first layer 110 can be finely adjusted. Although the amount of code in the first layer 110 is adjusted in the above-described embodiment, it goes without saying that the amount of code not only in the first layer 110 but also in the second layer 120 and other layers can be adjusted as well. Further, although the foregoing embodiment is described with regard to color image data, the embodiment can be applied not only to color image data but also to monochrome image data. If this embodiment is applied to monochrome image data, the component partitioning described above will be unnecessary. Further, in case of monochrome image data, the image will contain no color image data. Accordingly, the decision as to whether coded data is coded data that has an influence upon image quality will be that the higher the frequency components in the coded data, the smaller the influence upon the image data will be, and this decision will be rendered without taking color image data into consideration. For example, the influence upon image quality is smallest with the 1HH subband followed by the 1HL subband, or with the 1LH subband followed by the 2HH and 2HL subbands in the order mentioned, or with the 2LH subband followed by the 3HH and 3HL subbands in the order mentioned, or by the 3LH subband followed by the 3L subband.

In the foregoing embodiment, control is by software. However, some or all of the operations may be controlled by hardware. Further, although binary arithmetic coding is carried out in the foregoing embodiment, coding is not limited to binary arithmetic coding as long as the wavelet transform coefficients can be converted to binary code.

As many apparently widely different embodiments of the present invention can be made without departing from the spirit and scope thereof, it is to be understood that the invention is not limited to the specific embodiments thereof except as defined in the appended claims.

What is claimed is:

1. An image data coding apparatus comprising:
  a subband partitioning device for obtaining subband coefficients by partitioning image data into a plurality of subbands of different frequency components;
  a code block partitioning device for partitioning the subband coefficients, which have been obtained by said subband partitioning device, into a plurality of code blocks;
  a coding device for obtaining coded data by generating coding passes per bit plane with respect to subband coefficients included in the code blocks resulting from partitioning by said code block partitioning device, and binary coding the subband coefficients within the coding passes;
  a deciding device for deciding, in coding-pass units, coded data, from among the coded data obtained by said coding device, for which a distortion ratio at a time of decoding into an image will fall within prescribed limits;
  a layer generating device for repeating the coding by said coding device as well as the deciding of the coded data by said deciding device with regard to the plurality of code blocks resulting from partitioning by said code block partitioning device, thereby generating a layer that is to undergo adjustment of amount of coded data, the layer being a collection of coded data for which the distortion ratio at the time of decoding into an image will fall within prescribed limits; and
  a coded data amount adjusting device for adding, in coding-pass units, coded data having little influence upon image quality to a layer to undergo adjustment of amount of coded data, or deleting, in coding-pass units, coded data having little influence upon an image quality from a layer to undergo adjustment of amount of coded data, in such a manner that the amount of coded data included in a layer generated by said layer generating device will take on a target amount of data,
  wherein the coded data added on or deleted comprises coded data, from among the coded data obtained by said coding device, which is included in a layer to undergo adjustment of amount of coded data,
  wherein the coded data amount adjusting device adds, in coding-pass units, coded data having little influence upon image quality to a layer to undergo adjustment of amount of coded data in such a manner that the amount of coded data included in a layer generated by the layer generating device will take on a target amount of data, and
  wherein the coded data added on comprises coded data, from among the coded data obtained by the coding device, which is included in a layer to undergo adjustment of amount of coded data.

2. The apparatus according to claim 1, wherein coded data obtained by coding subband coefficients of high-frequency components has less influence upon the image quality in comparison with coded data obtained by coding subband coefficients of low-frequency components.

3. The apparatus according to claim 1, wherein the image data comprises color image data;
  said apparatus further comprises a data partitioning device in which color image data is partitioned into luminance data and color data;
  processing by said subband partitioning device, processing by said coding device and processing by said deciding device is executed for every item of data of the luminance data and color data resulting from partitioning by said data partitioning device;
  said layer generating device generates a layer that is to undergo adjustment of amount of coded data, the layer being a collection of coded data regarding luminance data and color data for which the distortion ratios at the time of decoding into an image will fall within prescribed limits; and
  coded data obtained by coding subband coefficients regarding the color data has less influence upon image quality in comparison with coded data obtained by coding subband coefficients regarding the luminance data.

4. The apparatus according to claim 1, wherein said subband partitioning device subjects image data to a wavelet transform, thereby partitioning the image data into subbands having different frequency components to thereby obtain wavelet transform coefficients.

5. A method of controlling an image data coding apparatus comprising:
  a subband partitioning device obtaining subband coefficients by partitioning image data into a plurality of subbands of different frequency components;
  a code block partitioning device partitioning the subband coefficients, which have been obtained by the subband partitioning device, into a plurality of code blocks;
  a coding device obtaining coded data by generating coding passes per bit plane with respect to subband coefficients included in the code blocks resulting from partitioning by the code block partitioning device, and binary coding the subband coefficients within the coding passes;
  a deciding device deciding, in coding-pass units, coded data, from among the coded data obtained by the coding device, for which a distortion ratio at a time of decoding into an image will fall within prescribed limits;
  a layer generating device repeating the coding by the coding device as well as the deciding of the coded data by the deciding device with regard to the plurality of code blocks resulting from partitioning by the code block partitioning device, thereby generating a layer that is to undergo adjustment of amount of coded data, the layer being a collection of coded data for which the distortion ratio at the time of decoding into an image will fall within prescribed limits; and
  a coded data amount adjusting device adding, in coding-pass units, coded data, which has little influence upon an image quality, to a layer to undergo adjustment of amount of coded data, or deleting, in coding-pass units, coded data, which has little influence upon the image quality, from a layer to undergo adjustment of amount of coded data, in such a manner that the amount of coded data included in a layer generated by the layer generating device will take on a target amount of data, wherein the coded data added on or deleted comprises coded data, from among the coded data obtained by the coding device, which is included in a layer to undergo adjustment of amount of coded data, wherein the coded data amount adjusting device adds, in coding-pass units, coded data having little influence upon image quality to a layer to undergo adjustment of amount of coded data in such a manner that the amount of coded data included in a layer generated by the layer generating device will take on a target amount of data, and wherein the coded data added on comprises coded data, from among the coded data obtained by the coding device, which is included in a layer to undergo adjustment of amount of coded data.

6. A non-transitory computer readable medium storing a computer-readable program for controlling a computer of an image data coding apparatus so as to:

acquire subband coefficients by partitioning image data into a plurality of subbands of different frequency components;

partition the acquired subband coefficients into a plurality of code blocks;

acquire coded data by generating coding passes per bit plane with respect to subband coefficients included in the code blocks resulting from partitioning, and binary code the subband coefficients within the coding passes;

decide, in coding-pass units, coded data, from among the acquired coded data, for which a distortion ratio at a time of decoding into an image will fall within prescribed limits;

repeat the coding as well as the deciding of the coded data with regard to the plurality of code blocks resulting from partitioning, thereby generating a layer that is to undergo adjustment of amount of coded data, the layer being a collection of coded data for which the distortion ratio at the time of decoding into an image will fall within prescribed limits; and add, in coding-pass units, coded data, which has little influence upon an image quality, to a layer to undergo adjustment of amount of coded data, or delete, in coding-pass units, coded data, which has little influence upon the image quality, from a layer to undergo adjustment of amount of coded data, in such a manner that the amount of coded data included in a generated layer will take on a target amount of data, wherein the coded data added on or deleted comprises coded data, from among the acquired coded data, which is included in a layer to undergo adjustment of amount of coded data, wherein the adding further adds, in coding-pass units, coded data having little influence upon image quality to a layer to undergo adjustment of amount of coded data in such a manner that the amount of coded data included in a layer generated will take on a target amount of data, and wherein the coded data further added on comprises coded data, from among the coded data obtained by the coding device, which is included in a layer to undergo adjustment of amount of coded data.

7. The apparatus according to claim 1, wherein the layer generating device further generates a second layer that is to undergo adjustment of amount of coded data, the second layer comprising a collection of coded data for which the distortion ratio at the time of decoding into the image will fall outside the prescribed limits of the layer.

8. The apparatus according to claim 7, wherein the coded data amount adjusting device deletes, in coding-pass units, coded data having little influence upon the image quality from the second layer and the deleted coded data is added to the layer for which the distortion ratio at the time of decoding into the image falls within the prescribed limits.

* * * * *